United States Patent Office 2,742,433
Patented Apr. 17, 1956

2,742,433
HEAT TRANSFER AGENTS

Peter Simons, Leverkusen-Bayerwerk, Wilhelm Moschel and Heinz Jonas, Leverkusen-Wiesdorf, and Walter Noll, Leverkusen-Bayerwerk, Germany, assignors to Farbenfabriken Bayer Aktiengesellschaft No Drawing. Application November 4, 1952,
Serial No. 318,758

5 Claims. (Cl. 252—78)

The present invention relates to heat transfer agents; more particularly it concerns improvements in increasing the thermostability of tetraaryl silicates.

Tetraaryl silicates, such for example as tetracresyl silicate and tetraxylene silicate, are employed as liquid heat transfer agents. Said products are distinguished by a relatively low solidification point (partly below −20° C.) and a high boiling point (above 400° C.). When these products are used as heating bath liquids in a continuous operation at temperatures up to 380° C. they are gradually affected at the said temperatures despite the exclusion of air and moisture, their viscosity increasing and the temperature of the initial boiling point decreasing.

It has been proposed to avoid decomposition or resinification of tetraaryl silicates by the addition of a certain quantity of the corresponding phenol whereby the phenol shall effect self-regeneration of the aryl silicate. Though the stability of tetraaryl silicates can be improved to a certain degree by the addition of phenols it is desirable to ensure further improvements of thermostability when the products are intended to be used in a continuous operation.

In accordance with the present invention it has surprisingly been found that the thermostability of aryl silicates such as phenyl-, cresyl-, xylenyl silicates and mixtures thereof can substantially be improved by the addition of a chemically inert, thermostable, preferably aromatic or hydroaromatic substance the boiling point of which ranges between about 180 and 300° C., for instance naphthalene, diphenyl, tetrahydronaphthalene, dekahydronaphthalene and acetophenone, which do not affect the chemical constitution of the aryl silicate. Depending upon the character and quantity of the addition component the boiling point of the mixture can be adjusted at will to a temperature ranging between the boiling point of the aryl silicate and that of the addition component. A small quantity of the said compounds already results in a considerable improvement over the heretofore used addition products. The thermostability of the tetraaryl silicates is increased with increasing quantities of the addition component, however, on the other hand, the boiling point is lowered. It has been shown that a small addition of the components useful according to the invention results in a substantial increase in thermostability and that the tetraaryl silicates containing said components are more thermostable than products containing larger quantities of phenols provided that, on the one hand, the lower boiling addition component is chemically inert and thermostable at the temperature applied and, on the other hand, contains no water and does not take part in a reaction yielding water, respectively.

Presumably, the comparatively low boiling point of the addition component substantially inhibits local overheating and, owing to the higher vapor pressure, favors the formation of a vapor protective layer above the level of the heating bath liquid, the admission of air and moisture thus being rendered difficult.

To illustrate the effects achieved by the invention, tetracresyl silicate containing 3 per cent of tetrahydronaphthalene, and for comparison, tetracresyl silicate as such and tetracresyl silicate containing 10 per cent of cresol were tested for viscosity under equal conditions after definite periods of time. The viscosities were measured at 50° C.

|  | B. P., ° C. | Viscosity in centistokes | | |
|---|---|---|---|---|
|  |  | at the beginning | after 500 hours at 300° C. | difference |
| Tetracresyl silicate containing 3 percent of tetrahydronaphthalene | 370 | 9.6 | 11.4 | 1.8 |
| Tetracresyl silicate containing no addition component | 430 | 11.0 | 17.0 | 6.0 |
| Tetracresyl silicate containing 10 percent of cresol | 300 | 8.4 | 13.5 | 5.1 |

We claim:

1. A heat-transfer agent, essentially consisting of a major portion of a tetraaryl silicate and a minor portion of a thermostable aromatic hydrocarbon having a boiling point between 180° C. and 300° C., and being chemically inert toward the other constituents, said aromatic hydrocarbon being present in amount sufficient to substantially increase the thermostability of the tetracresyl silicate.

2. A heat-transfer agent according to claim 1, in which said thermostable aromatic hydrocarbon is tetrahydronaphthalene.

3. A heat-transfer agent according to claim 1, in which said thermostable aromatic hydrocarbon is naphthalene.

4. Heat-transfer agent according to claim 1, in which said thermostable aromatic hydrocarbon is diphenyl.

5. Heat-transfer agent according to claim 1, in which said thermostable aromatic hydrocarbon is dekahydronaphthalene.

References Cited in the file of this patent
UNITED STATES PATENTS

| 2,389,804 | McGregor et al. | Nov. 27, 1945 |
| 2,445,567 | Elliot | July 20, 1948 |
| 2,555,721 | Wiener | June 5, 1951 |
| 2,584,334 | Da Fano | Feb. 5, 1952 |